United States Patent [19]
Benedikt et al.

[11] Patent Number: 5,503,023
[45] Date of Patent: Apr. 2, 1996

[54] PRESSURE SENSOR FOR DETECTING THE PRESSURE IN THE COMBUSTION CHAMBER OF INTERNAL-COMBUSTION ENGINES

[75] Inventors: Walter Benedikt, Kornwestheim; Manfred Vogel, Ditzingen-Heimerdingen; Werner Herden, Gerlingen; Wolfgang Schmidt, Vaihingen/Enz; Matthias Kuesell, Korntal-Münchingen; Frank Stanglmeier, Möglingen, all of Germany

[73] Assignee: Robert Bosch GmbH, Stuttgart, Germany

[21] Appl. No.: 838,239

[22] PCT Filed: Jun. 27, 1991

[86] PCT No.: PCT/DE91/00527

§ 371 Date: Mar. 3, 1992

§ 102(e) Date: Mar. 3, 1992

[87] PCT Pub. No.: WO92/01915

PCT Pub. Date: Feb. 6, 1992

[30] Foreign Application Priority Data

Jul. 18, 1990 [DE] Germany ............... 40 22 781.2
Feb. 7, 1991 [DE] Germany ............... 41 03 705.7

[51] Int. Cl.[6] ................. G01L 9/04; G01L 7/08
[52] U.S. Cl. ................................. 73/726; 73/115
[58] Field of Search ............... 73/115, 727, 726, 73/720, 721, 706, 754, 862.382, 862.632, 862.634, DIG. 4; 338/4, 42

[56] References Cited

U.S. PATENT DOCUMENTS

| | | | |
|---|---|---|---|
| 3,204,463 | 9/1965 | Taber | 73/726 |
| 4,567,751 | 2/1986 | Ootsuka et al. | 73/35 |
| 4,606,228 | 8/1986 | Whitemore | 73/718 |
| 4,645,965 | 2/1987 | Paganelli | 310/338 |
| 4,993,266 | 2/1991 | Omura et al. | 73/754 |
| 5,095,741 | 3/1992 | Bartig et al. | 73/115 |
| 5,142,914 | 9/1992 | Kusakabe et al. | 73/115 |

FOREIGN PATENT DOCUMENTS

| | | |
|---|---|---|
| 0179278 | 4/1986 | European Pat. Off. . |
| 2626670 | 4/1989 | France . |
| 3125640 | 1/1983 | Germany . |
| 3339875 | 5/1985 | Germany . |

*Primary Examiner*—Richard Chilcot
*Assistant Examiner*—William L. Oen
*Attorney, Agent, or Firm*—Michael J. Striker

[57] ABSTRACT

In a pressure sensor, the force is introduced onto a piezoresistive measuring element via a diaphragm and a punch. Since no exact mechanical adjustment between the diaphragm and the measuring element is necessary, various relatively inexpensive forms of diaphragm with different measuring sensitivity can be used. The punch and the piezoresistive measuring element can be pushed through an opening in the housing and pressed onto the diaphragm so as to provide an interlocking frictional connection between the punch and the measuring element.

13 Claims, 5 Drawing Sheets

PRESSURE SENSOR FOR DETECTING THE PRESSURE IN THE COMBUSTION CHAMBER OF INTERNAL-COMBUSTION ENGINES

BACKGROUND OF THE INVENTION

The present invention relates to a pressure sensor.

More particularly, it relates to a pressure sensor which has a housing, and a punch arranged between a diaphragm and a measuring element in the housing to introduce the pressure onto the measuring element.

The invention also deals with a process of producing such a pressure sensor. In the case of such a pressure sensor, known from German Offenlegungsschrift 31 25 640.6, the piezoresistive measuring elements, such as for example thick-film resistors of cermet, contactive plastic or metal, are applied to a base. The resistor element and the base are arranged as close as possible to the pressure chamber in order to be able to determine the prevailing pressure. Furthermore, the measuring signal is passed with the aid of electric leads to an electronic evaluation circuit arranged outside the housing of the pressure sensor. As a result, the piezoresistive elements and the electronic components have to be elaborately connected to one another with the aid of sheathed leads. Since the piezoresistive measuring element is exposed directly to the pressure, it is also exposed to the high temperatures prevailing in the combustion chamber. The flames spread there at a temperature of about 2000° C., whereby stresses can occur in the housing. As a result, the pressure signal is falsified by the high temperatures.

Furthermore, European Preliminary Published Specification 85 111 895.0 discloses a pressure sensor in which the thick-film resistor is arranged on the bottom of a base. However, this pressure sensor is intended only for determining the pressure in distributor pumps. The high temperatures prevailing in the combustion chamber would falsify the measuring signal in the case of this design as well.

U.S. Pat. No. 4,645,965 describes a pressure sensor of which the measuring element consists of piezoelectric material. This piezoelectric element is arranged in a housing which has an opening towards the combustion chamber. This opening is closed off by a diaphragm, the piezoelectric element being in effective connection with this diaphragm, and consequently with the pressure prevailing in the combustion chamber, via a punch. The piezoelectric element bears against a shoulder formed in the housing. The use of the piezoelectric element also gives rise to constructional differences in comparison with the subject-matter of the application. In general, it is required that the measuring element operates potential-free. As a result, it is necessary that, in addition to the two contact discs already necessary for the piezoelectric element, a further insulating disc is fitted between the contact discs and the counterbearing. The contacting of the piezoelectric ceramic disc is possible only by elaborate welding of a wire or with the aid of a relief in the punch. If again a potential-free sensor is chosen, this effort would also double. Since the piezoceramic element has to be used as a discrete component, it is also relatively expensive in construction. Furthermore, several bonding points, elaborate and falsifying the measuring signal, are required. Even in a normal case with a piezoelectric disc and two contact discs, this results in four bonding points; with a potential-free sensor, it would be five bonding points. Owing to the measuring principle used as a basis, it is essential that the punch is bonded perpendicularly onto the piezoelectric element. Piezoceramic elements have a disadvantageous, relatively high temperature response of measuring sensitivity, which may lie between 15% and 70% in the application temperature range. Aging over the service life is typically 2% to 10%. The hysteresis of the piezoceramic of 5% to 25% is very high and thereby significantly restricts the accuracy of the combustion chamber pressure measurement. In particular, however, the multilayered construction of the piezoelectric arrangement makes relatively elaborate and complicated fitting into the housing of the pressure sensor necessary. In the case of piezoelectric elements, as distinct from piezoresistive elements, under the effect of pressure a charge is generated, and consequently a voltage, for producing the measuring signal. This voltage is picked up and evaluated. As distinct from this, in the case of piezoresistive elements a voltage is applied, and the electrical resistance in the piezoresistive element is changed by the pressure acting. Since, in the case of this pressure sensor, the piezoelectric element and the punch are fitted from one side into the bore and the latter is closed by a pot diaphragm, the position of the pot diaphragm and of the piezoelectric element have to be matched precisely to each other. This can be achieved only with a pot diaphragm.

SUMMARY OF THE INVENTION

Accordingly, it is an object of the present invention to provide a pressure sensor for detecting a pressure in a combustion chamber of internal combustion engine and a process of producing the same, which avoids the disadvantages of the prior art.

In keeping with these objects and with others which will become apparent hereinafter, one feature of the present invention resides, briefly stated, in a pressure sensor having a housing and a punch arranged between a diaphragm and a measuring element of the housing and introducing a pressure onto the measuring element, wherein in accordance with the present invention the measuring element is formed as a piezoresistive element and the diaphragm is fastened on the shank of the housing without mechanical exact adjustment in relation to the measuring element.

Still another feature of the present invention is a process for producing a pressure sensor, in accordance with which a diaphragm is fastened on a housing of the pressure sensor, and a punch and a piezoresistive measuring element are pushed through a second opening into the housing and pressed onto a diaphragm in such a way that an interlocking frictional connection is produced between the punch and the measuring element.

The pressure sensor designed in accordance with the present invention, has the advantage that piezoresistive measuring elements are, in principle, potential-free if they are realised on an insulating substrate. As a result, no additional constructional measures are necessary any longer. Furthermore, a piezoresistive measuring element comprises only one layer. If a thick-film resistor is used as piezoresistive element, it can be printed on by particularly simple, and consequently extremely inexpensive, standard techniques. In this case, printing onto the contacting conductor tracks is possible, the connecting leads being able to be soldered onto the conductor tracks. As distinct from the piezoelectric effect, in the case of the piezoresistive element no bonding points are necessary. In order to prevent slipping during assembly, there may possibly be an adhesive layer between the substrate and the counter-bearing. Homogeneous force introduction onto the piezoresistive element can be achieved without great constructional effort. By simple impressing of the thick-film resistor with a soft punch tip, a uniform force distribution over the entire loaded surface area of the thick-film resistor is possible. No additional elaborate adjustment is required. Piezoresistive elements, specifically cermet thick-film resistors, have a low temperature response of measuring sensitivity, which is only between 5% and 10%, seen over the entire application temperature range. Aging over the service life of the piezoresistive elements is very low and lies below 2%. Furthermore, the piezoresistive elements have virtually no hysteresis; it would lie below 1%. If piezoresistive elements are used, it is possible to compensate in a simple way for the roughnesses occurring at the end of the punch. By the use of a relatively soft material for the punch, but in particular by the use of a soft material for the end of the punch facing the piezoresistive element, a uniform force introduction over the entire contact area is possible.

The use of a piezoresistive measuring element also allows the use of alternative and inexpensive diaphragm designs differing from that of the pot diaphragm. There need not be any precise predetermined position. Rather, it is possible to leave matching the two parts, diaphragm and measuring element, to each other until fitting.

During the impressing of the glass layer surrounding the piezoresistive element with the punch and the setting of the prestressing, the electrical variables of the piezoresistive measuring element and of its evaluation electronics are measured and set to a desired nominal value. As a result, an exact trimming is possible in a Simple and inexpensive way without mechanically exact adjustment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED
EMBODIMENTS

Figure 1:
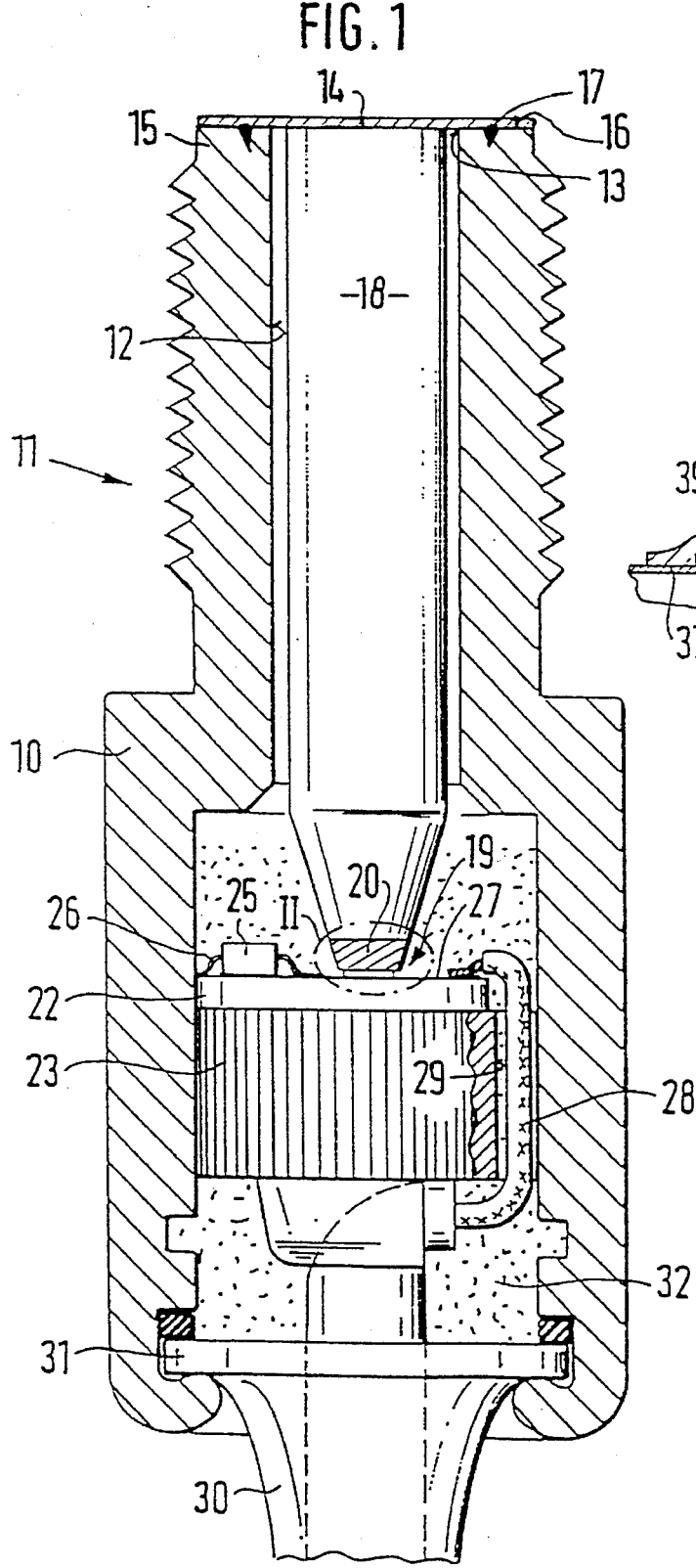
FIG. 1 shows a section through a pressure sensor.

In FIG. 1, 10 denotes the housing of a pressure sensor 11 for determining the pressure in the combustion chamber of an internal-combustion engine. It has a central, continuous stepped bore 12. The opening 13 of the housing 10 facing the combustion chamber is closed off by a diaphragm 14. In FIG. 1, the diaphragm 14 is designed as a plate which is fastened on the end face 16 of the shank 15 of the housing 10 with the aid of a welded joint 17. The diaphragm 14 is formed particularly advantageously from a superalloy, that is to say an alloy of, for example, about 50% Ni, 20% Cr, 20% Fe. Against the middle area of the diaphragm 14 there bears with its one end a punch 18, which with its other end bears against a piezoresistive measuring element 19. Piezoresistive measuring elements are to be understood as elements which change their resistance value under the effect of pressure. For this, thick-film resistors may be used for example. As materials for this, cermet, contactive plastic or metal etc. can be used. The measuring element 19 is printed onto the base of a hybrid 22. A hybrid is normally to be understood as a base having printed-on circuit parts, such as for example resistors and conductor tracks etc. with semiconductors such as ICs (integrated circuits), which are placed on the base and bonded to the circuit parts, for example by bonding wires. The punch 18 itself may consist of glass ceramic, in order thereby to ensure a good thermal insulation between the diaphragm, that is to say between the pressure chamber of which the pressure is to be determined, and the piezoresistive measuring element. The end of the punch 18 facing the hybrid 22 may be conically designed, so that its end has approximately the diameter of the measuring element 19. This makes it possible to guide the punch 18 in the bore 12, but on the other hand to limit the area of pressure transfer to the size of the measuring element 19. The base 20 of the hybrid bears furthermore against a counterbearing 23, pressed into the bore 12.

The conical design of the end of the punch 18 may be necessary in order to match the congruent surfaces of the piezoresistive measuring element 19 and of the end of the punch 18 approximately to each other. If, on the other hand, the entire punch were to be reduced in its diameter, the punch could possibly break off during pressure transfer. In order to ensure as defined a force introduction as possible from the punch onto the piezoresistive measuring element 19, the punch 18 is produced from a relatively soft material, at least in the end region 20. This makes it possible for surface roughnesses of the end of the punch to be prevented from having the effect of measuring errors in the piezoresistive measuring element 19 by thus achieving a form fit between the end face of the end of the punch and the surface of the piezoresistive measuring element. Furthermore, it would also be conceivable to produce the entire punch 18 from a soft material. This would, however, in turn adversely affect the rigidity of the punch 18. When selecting the material for the punch 18 it must also be taken into consideration that the punch is to have as low a thermal conductivity as possible, so that the measuring signals are not falsified by temperature fluctuations or by any influencing by the temperature itself. Glass ceramic, for example, has a good low thermal conductivity. Relatively soft metal, for example Al, brass, Cu, plastic etc. may be used for example as material for the region 20 of the punch 18. The material for the region 20 need not be matched to the low thermal conductivity.

As well as the piezoresistive measuring element 19, on the same side of the base of the hybrid 22 are also the electronic components 25 of the evaluation circuit, such as for example resistors, transistors etc. The electronic semiconductor components 25 and the piezoresistive measuring element 19 are connected with the aid of bonding wires 26 and thick-film conductor tracks 27. The output of the preprocessing circuit is led via a lead 28 to an evaluation circuit and control device (not shown) of the internal-combustion engine. For this, the counterbearing 23 has a continuous bore 29, which runs approximately axially parallel to the bore 12 and in which the outgoing lead 28 is guided. The lead 128 is fastened in a grommet 30 of the cover 31 closing off the bore 12. For protection against harmful environmental influences, such as for example moisture, the bore 12 is filled in the region of the piezoresistive measuring element 19 and of the electronic components 25 and in the region between the counterbearing 23 and the cover 31 with a casting compound 32.

Instead of a bore 29, a segment may also be cut out on the counterbearing 23 for guiding through the lead 28. The counterbearing 23 may also, however, be screwed into a bore 12 of the housing 10.

Figure 2:
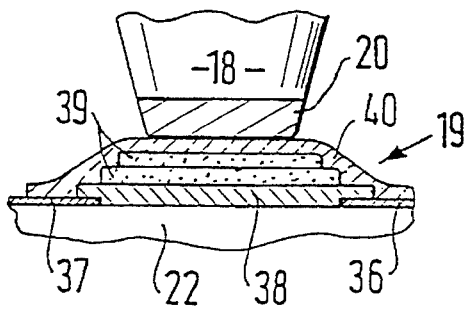
FIG. 2 shows a detail.

In FIG. 2, the design according to the invention of the piezoresistive measuring element is shown. A first (36) and a second conductor track 37 are printed on the base of the hybrid 22 of $Al_2O_3$ substrate. Printed on between the two conductor tracks 36, 37 is a first resistive film 38, the ends of the resistor run 38 overlapping with the ends of the two conductor tracks 36, 37, in order to establish an electric contact. Printed onto this first resistor run 38 in a layer-like manner are a plurality of further resistor runs 39. These further resistor runs are arranged here in such a way that a kind of pyramid is produced, which means that the resistors are in each case of shorter design in ascending sequence of the layers and consequently are not congruent or do not overlap in the edge region. The entire pyramidal arrangement of the resistor runs 38, 39 and at least the ends of the conductor tracks are covered by a glass layer 40, produced from a glass paste, in order to achieve an electrical insulation. The end of the punch 18 bears with its region 20 on the glass layer 40 or on the last of the resistor runs 39 in such a way that the punch 18 is placed quite centrally on this resistor run 39 only. This means that the force is introduced exclusively in the region of the uppermost resistive film and force bypasses are thus avoided.

For a particularly homogeneous force introduction onto the piezoresistive element 19, the punch 18 should have a soft tip 20 of, for example, Al, brass, Cu, plastic etc. With this soft tip, the punch is to be pressed onto the piezoresistive element 19 and here in particular onto the glass layer 40. The pressure for this should be greater than-the pressure later to be determined. For this, a multiple of the maximum pressure may be applied to the diaphragm and the punch or else the intended position deliberately overpressed when pressing in the counterbearing 23. This produces an impressing of the soft end of the punch.

It is also possible, however, instead of a single piezoresistive measuring element of a pyramidal design, to arrange additionally a further piezoresistive measuring element on the hybrid 22 or even 4 measuring elements. In this case, these resistor elements are wired to one another in a Wheatstone half-bridge or full-bridge circuit. One of the two or 2 of four piezoresistive measuring elements is then subjected to pressure by the punch 18, while the other piezoresistive measuring element or both other measuring elements are arranged as closely as possible in the region of the first or the two first piezoresistive measuring elements, but are not subjected to pressure. This makes it possible to carry out a temperature compensation without having to provide additional electronic components for a compensation of temperature fluctuations in the evaluation circuit.

The various resistor runs 38, 39 may be printed in or transversely to the direction of the current flowing through the resistor runs.

Particularly good measured values are possible by the arrangement according to the invention of the piezoresistive measuring element 19. Furthermore, a particularly simple assembly of the pressure sensor 11 is possible by the arrangement of the components 25 on a hybrid 22. The piezoresistive element 19, the electronic components 25 and the counterbearing 23 can be preassembled with the outgoing leads 28 as a structural unit outside the housing 10. Consequently, the components 25 and the piezoresistive measuring element 19 can be checked for their serviceability already when outside the housing 10 of the pressure sensor 11. During final assembly, consequently all that needs to be done is to push the preassembled, already checked unit from an opening of the bore 12 into the housing with inserted punch 18, until the punch bears against the diaphragm 14. Since the counterbearing 23 is pressed into the housing 10, the unit is easily centred and fixed in the housing 10.

Figure 3:
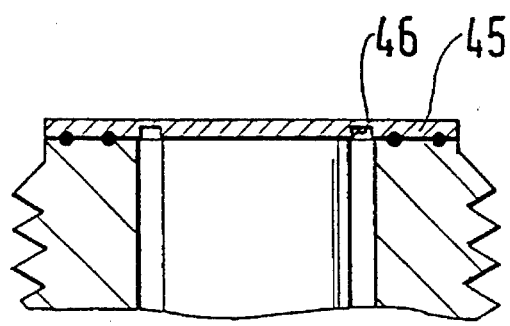
FIGS. 3 to 16 show various modifications of the form of the diaphragm, of the end of the punch and of the housing shank.
Figure 4:
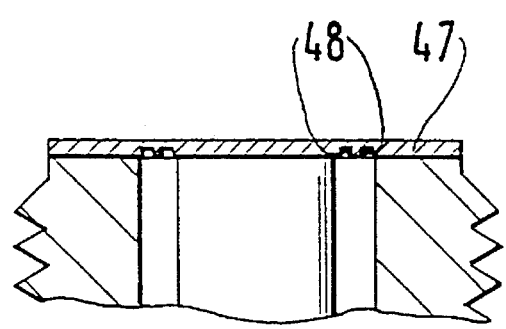
Figure 5:
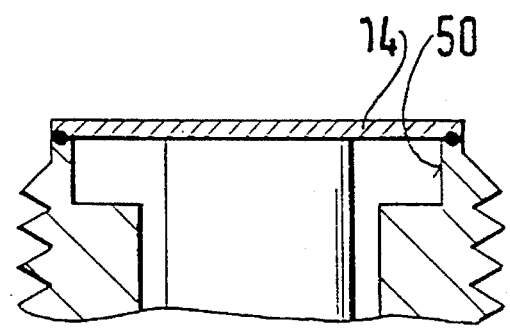
Figure 6:
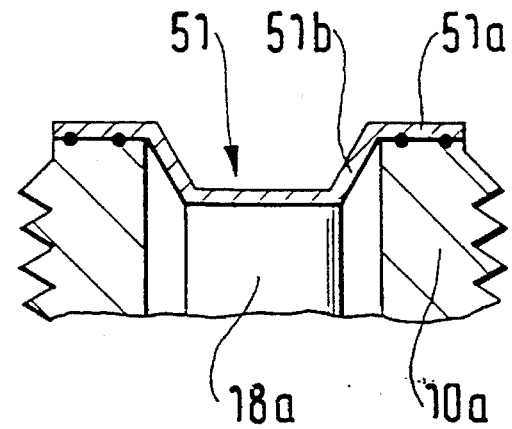

Since no exact mechanical adjustment is necessary between the piezoresistive measuring element 19 and the diaphragm 14, the most varied modifications of the diaphragm and of the shank of the housing can be used, as are represented in FIGS. 3 to 16. The diaphragms are in this case welded onto the empty housing 10. Since, as distinct from the prior art, it is possible for the punch 18 and the piezoresistive measuring element 19 to be fitted through a second opening of the housing, an overall matching of diaphragm, punch and piezoresistive element is not necessary or possible until in the final fitted state. The diaphragm can consequently be placed on the shank of the housing with great tolerances. The plate-shaped diaphragm shown in FIG. 1 would represent the most simple solution. It has, however, no special bending zone, so obtaining an exact measuring signal can be achieved only under certain circumstances. According to the modification of FIG. 3, the diaphragm 45 has an annular groove 46 between the shank 16 of the housing 10 in the wall facing the punch 18. In the region of this annular groove 46, the diaphragm 45 is particularly easily bendable, so that even small pressures can be detected. The diaphragm 47 of FIG. 4 represents an improvement of the measuring sensitivity in comparison with the diaphragm 45 of FIG. 3.

Figure 7:
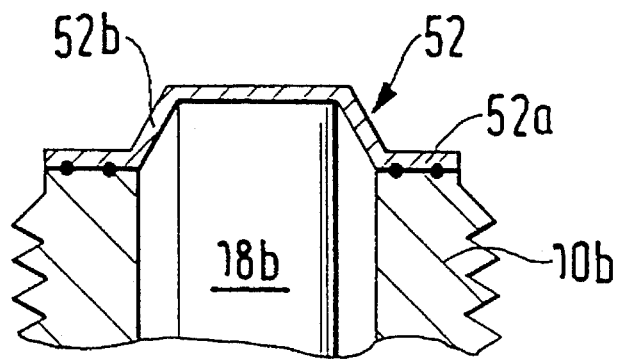
Figure 8:
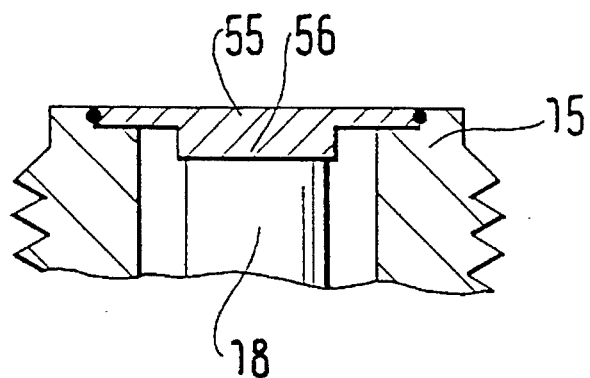
Figure 9:
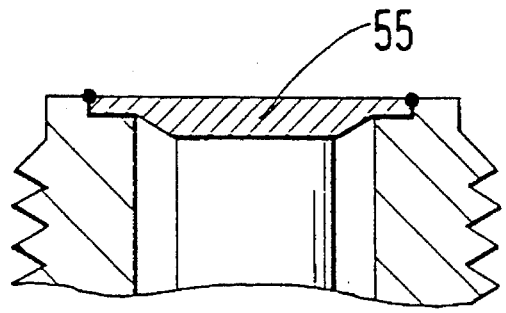
Figure 11:
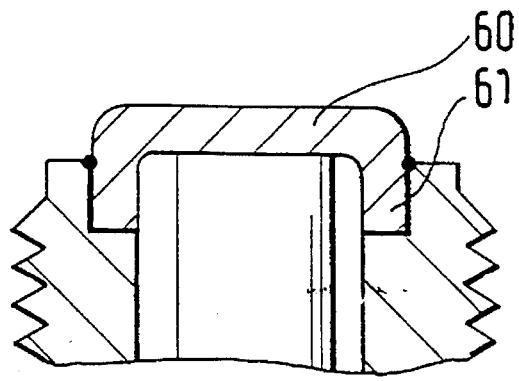

Here, instead of one annular groove 46, two narrow annular grooves 48 are formed next to each other. It is, of course, also possible to increase further the number of annular grooves in order to improve the measuring sensitivity. In the case; of the modification according to FIG. 5, the bending region is achieved by a recess 50 in the region of the opening of the housing 10, while, as in FIG. 1, a plate 14 is used as diaphragm. The diaphragms 51 and 52 shown in FIGS. 6 and 7, respectively, are kinematic reversals. While in FIG. 6 the punch 18a is shortened in relation to the housing 10a, the punch 18b in FIG. 7 is lengthened in relation to the housing 10b. As a result, in each case a bearing region 51a or 52a is produced for the diaphragm 51 or 52, respectively, on the shank of the housing and the punch, and in between these an obliquely running bending region 51b or 52b, respectively. As in FIG. 5, the shank of the housing of FIGS. 8, 9, 10a, b, 11, 13, 15, 17 again has a recess 50, in which however the diaphragm is arranged. In FIG. 8, the diaphragm 55 has in the region of the punch 18 a continuation 56, by which it rests on the punch 18, of shortened design in relation to the shank 15. As can be seen from FIGS. 8 and 9, various possibilities of compensating for the different thickness of the diaphragm 55 in the region bearing on the shank 15 and on the punch 18 are conceivable. In FIG. 9, the diaphragm 55 is conical in this region. In FIG. 11, the punch 18 is again of longer design than the shank 15. The diaphragm 60 has the form of a pot, but does not embrace the shank of the housing but bears against the wall 61 of the recess 50.

Figure 10A:
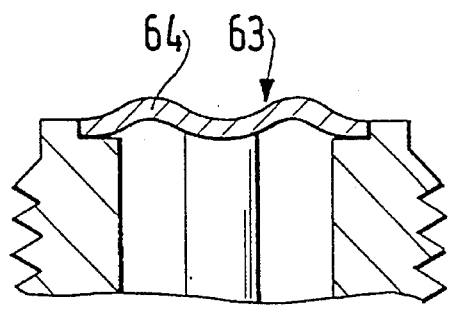
Figure 10B:
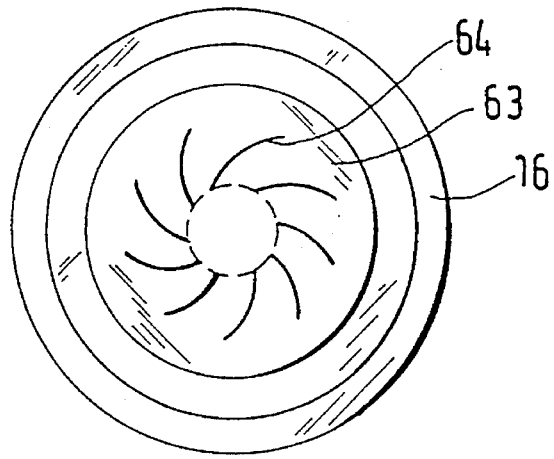
Figure 12:
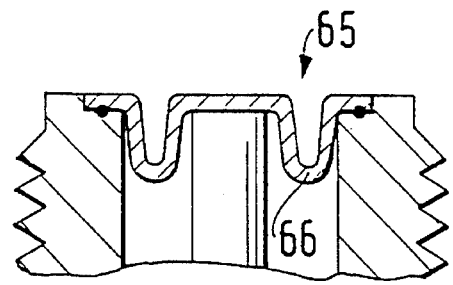
Figure 13:
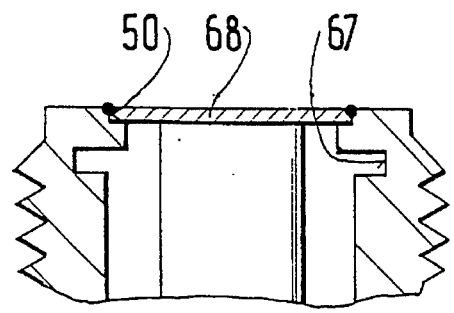

In FIGS. 10a, b, 12 and 13 the punch 18 terminates, approximately flush with the bottom of the recess 50 in the shank of the housing 10. The diaphragm 63 shown in FIGS. 10a, b has waves 64 serving as bending region, which waves represent spirally tangentially extending depressions. In FIG. 12, the bending region of the diaphragm 65 is an encircling wave 66. Depending of the height of this wave 66, the sensitivity of the diaphragm 65 can be varied. In the case of the design according to FIG. 13, an annular groove 67, formed in the shank 16, serves as bending region. The diaphragm 68 itself is again a plate, as already used in the case of the exemplary embodiment according to FIG. 5. The diaphragm 65 may in this case be arranged in the recess 50, or else be welded onto the end face of the shank 15.

Figure 14:
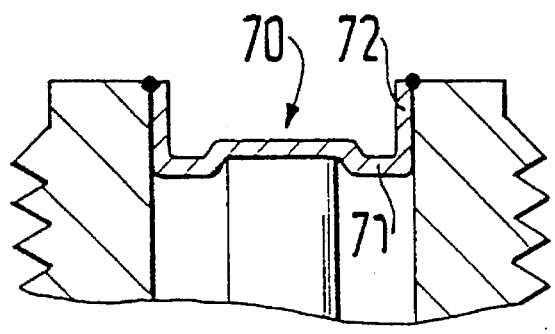

FIG. 14 shows a pressure sensor having a punch 69, shortened in relation to the shank 15. The diaphragm 70 is of approximately pot-shaped design and has a rising profile 71 in the bending region. The wall 72 of the diaphragm 70 bears against the inner wall of the shank 15.

Figure 15:
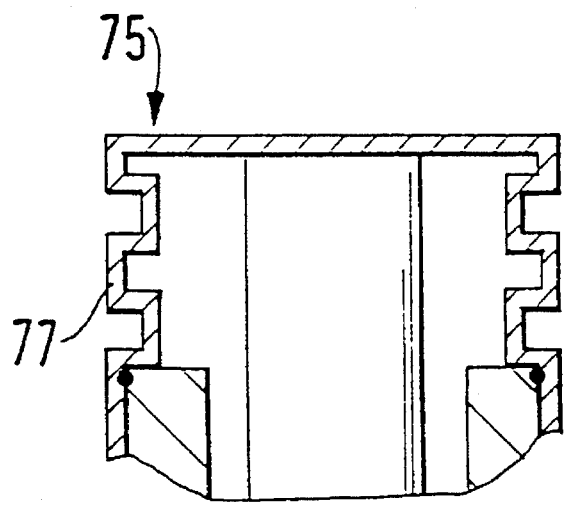
Figure 16:
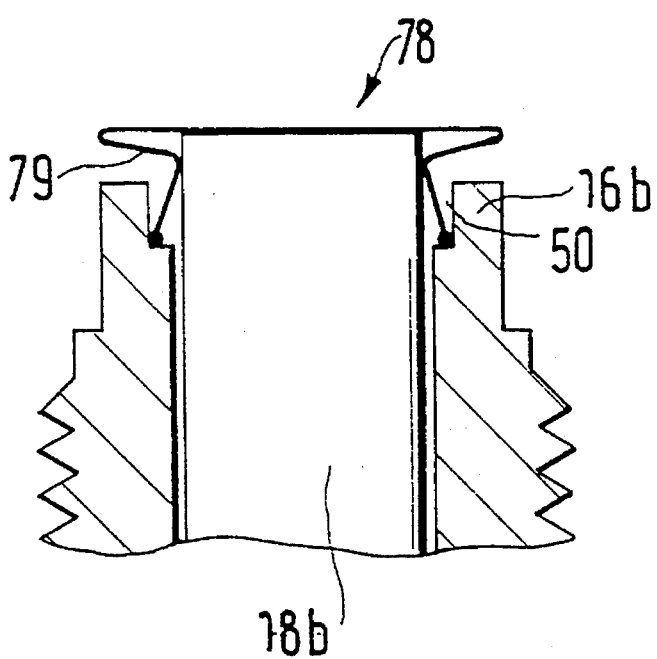

The two diaphragms 75 and 78 of FIGS. 15 and 16 do not exhibit any deformation in the actual measuring region but have resilient properties. For this, the diaphragm 75 has, seen cross-sectionally, a zig-zag region 77 in the area of the shank region protruding beyond the shank 15. In this region 77, the diaphragm 75 is of a resilient design. In FIG. 16, the diaphragm 78 has, seen cross-sectionally, an s-shaped region 79. In this case, the punch 18 again protrudes beyond the shank 15 and the diaphragm 78 is firmly welded in the recess 50.

It will be understood that each of the elements described above, or two or more together, may also find a useful application in other types of constructions differing from the types described above.

While the invention has been illustrated and described as embodied in a pressure sensor for detecting the pressure in the combustion chamber of internal-combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for producing a pressure sensor for detecting pressure in a combustion chamber of internal combustion engines and having a diaphragm, a measuring element and a punch, the process comprising the steps of fastening a diaphragm on a housing in a region of a first opening of the housing; and introducing a punch and a piezo-resistive measuring element through a second opening of the housing into the housing and pressing the punch onto the diaphragm in such a way that a form fit is produced between the punch and the measuring element.

2. A process for producing a pressure sensor for detecting pressure in a combustion chamber of internal combustion engines and having a diaphragm, a measuring element and a punch, the process comprising the steps of fastening a diaphragm on a housing in a region of a first opening of the housing; introducing a punch and a piezo-resistive measuring element through a second opening of the housing into the housing and pressing onto the diaphragm in such a way that a form fit is produced between the punch and the measuring element; and pressing a counterbearing for the punch so far into the housing that an impression of the punch is produced on one of the piezo-resistive measuring elements and a glass layer surrounding the piezo-resistive measuring element.

3. A process as defined in claim 2, and further comprising the step of placing the diaphragm onto a shank of the housing, which shank has the first opening, so that no mechanical adjustment is needed between the piezo-resistive measuring element and the diaphragm.

4. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said housing having a shank, said diaphragm being fastened on said shank of the housing.

5. A pressure sensor as defined in claim 4, wherein said shank of said housing has a recess, said diaphragm being arranged in said recess of said shank of said housing.

6. A pressure sensor as defined in claim 5, wherein said shank of said housing has an inner wall provided with an annular groove.

7. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm being formed as a plate.

8. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm having a side facing said punch and is provided with at least one annular groove in said side.

9. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm having a bending region formed by a spiral depression.

10. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm having a bending region formed as a conically running section.

11. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm having a continuation provided in a region of said punch.

12. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said diaphragm having a bending region formed by a radially encircling wave.

13. A pressure sensor for detecting pressure in a combustion chamber of internal combustion engines, comprising a housing; a diaphragm and a measuring element provided in said housing; a punch arranged between said diaphragm and said measuring element in said housing and introducing a pressure onto said measuring element, said measuring element being formed as a piezo-resistive element, said diaphragm being fastened to said housing so that no mechanical adjustment is needed between the piezo-resistive measuring element and the diaphragm, said punch having an end, said diaphragm having a substantially S-shaped region in an area of said end of said punch as seen in a cross-section.

* * * * *